(12) United States Patent
Kimura et al.

(10) Patent No.: US 10,899,266 B2
(45) Date of Patent: Jan. 26, 2021

(54) SNOW REMOVAL MACHINE

(71) Applicant: HONDA MOTOR CO., LTD., Tokyo (JP)

(72) Inventors: Yuta Kimura, Wako (JP); Yoshimasa Teruya, Wako (JP); Jun Fukano, Wako (JP); Tsutomu Mizoroke, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 190 days.

(21) Appl. No.: 16/014,267

(22) Filed: Jun. 21, 2018

(65) Prior Publication Data
US 2019/0031080 A1    Jan. 31, 2019

(30) Foreign Application Priority Data

Jul. 31, 2017    (JP) .................................. 2017-148090

(51) Int. Cl.
| | | |
|---|---|---|
| *B60Q 1/00* | (2006.01) | |
| *B60Q 1/24* | (2006.01) | |
| *E01H 5/04* | (2006.01) | |
| *E01H 5/09* | (2006.01) | |

(52) U.S. Cl.
CPC ............. *B60Q 1/0017* (2013.01); *B60Q 1/24* (2013.01); *E01H 5/045* (2013.01); *E01H 5/098* (2013.01)

(58) Field of Classification Search
CPC ...... B60Q 1/02; B60Q 1/0416; B60Q 1/0017; B60Q 1/24; E01H 5/09; E01H 5/45
See application file for complete search history.

(56) References Cited

U.S. PATENT DOCUMENTS

| | | | | |
|---|---|---|---|---|
| 3,934,134 A  * | 1/1976 | Wassel | ................. | B60Q 1/0035 |
| | | | | 362/549 |
| 4,150,501 A  * | 4/1979 | Hayashi | .................... | E01H 5/04 |
| | | | | 37/246 |
| 4,224,657 A  * | 9/1980 | Olson | ................... | B66F 9/0755 |
| | | | | 362/481 |
| 5,079,864 A  * | 1/1992 | Roy | ...................... | A01B 59/062 |
| | | | | 37/302 |
| 6,487,798 B2 * | 12/2002 | Sueshige | ................. | E01H 5/045 |
| | | | | 37/260 |
| 7,422,408 B2 * | 9/2008 | Sobota | ..................... | A61G 3/06 |
| | | | | 362/481 |

(Continued)

OTHER PUBLICATIONS

European Search Report dated Dec. 7, 2018, 6 pages.

*Primary Examiner* — Jessica H Lutz
(74) *Attorney, Agent, or Firm* — Rankin, Hill & Clark LLP

(57) ABSTRACT

A snow removal machine capable of illuminating, with a light projector, a dropped position of snow that varies depending on a direction of a chute guide. A working machine as a snow removal machine includes a machine body, and a chute that is provided on the machine body, and throws away snow. The chute includes a chute main body extending upwardly from the machine body, and a chute guide that is pivotably provided on a distal end portion of the chute main body, and adjusts a snow throwing direction that is an up-down direction of the snow to be thrown, the chute guide is connected to the chute main body side through a link, and the link is provided with a light projector so as to be capable of illuminating a dropped position of the snow to be thrown.

10 Claims, 14 Drawing Sheets

(56) References Cited

U.S. PATENT DOCUMENTS

| | | | |
|---|---|---|---|
| 7,621,546 B2 * | 11/2009 | Ross | B60Q 1/323 |
| | | | 280/166 |
| 2002/0062582 A1 * | 5/2002 | Takeuchi | E01H 5/045 |
| | | | 37/244 |
| 2008/0011554 A1 * | 1/2008 | Broesel | B66F 9/0755 |
| | | | 187/224 |
| 2014/0013633 A1 * | 1/2014 | Raasch | E01H 5/045 |
| | | | 37/197 |
| 2014/0268746 A1 * | 9/2014 | Paine | B60Q 1/0088 |
| | | | 362/235 |
| 2015/0007462 A1 * | 1/2015 | Cohen | E01H 5/045 |
| | | | 37/242 |
| 2015/0068074 A1 * | 3/2015 | Mast | E01H 5/098 |
| | | | 37/197 |
| 2016/0200240 A1 * | 7/2016 | Quinlan | B60Q 1/0023 |
| | | | 315/80 |
| 2017/0015537 A1 * | 1/2017 | Bosworth, III | B66F 9/0755 |
| 2017/0088042 A1 * | 3/2017 | Yomkil | B60Q 1/24 |
| 2018/0019788 A1 * | 1/2018 | Wadell | B60L 1/00 |
| 2018/0265340 A1 * | 9/2018 | Luminet | B60Q 1/24 |
| 2018/0347803 A1 * | 12/2018 | Dimsey | F21V 33/00 |
| 2019/0323190 A1 * | 10/2019 | Waelbers | G05D 1/0221 |
| 2019/0341826 A1 * | 11/2019 | Zeiler | H02K 11/0094 |

\* cited by examiner

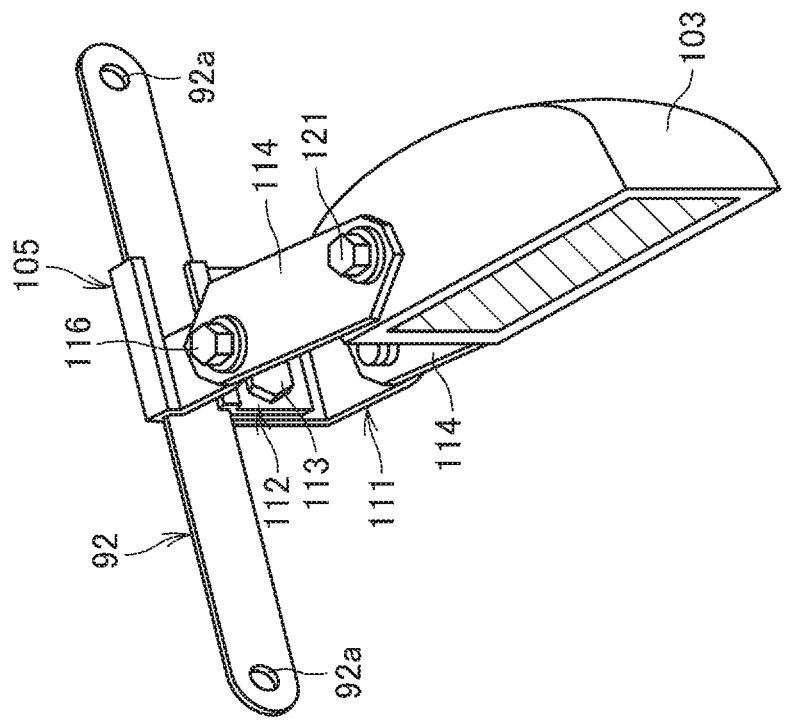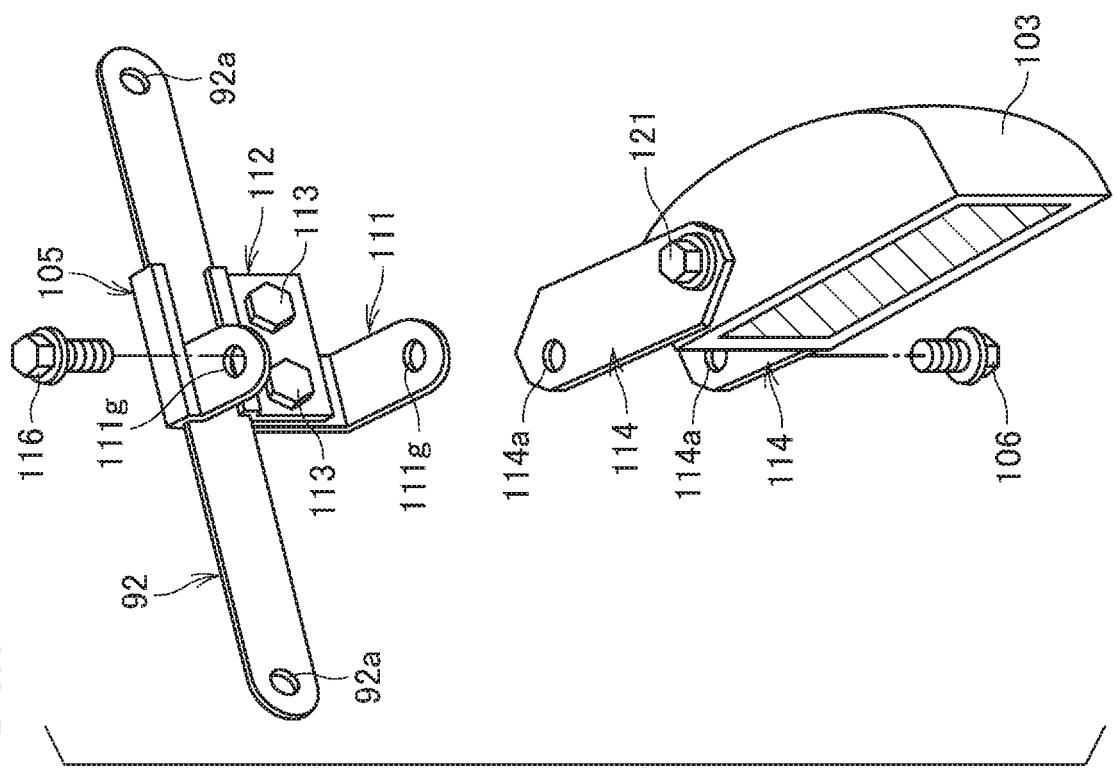

[COMPARATIVE EXAMPLE] FIG.8

[COMPARATIVE EXAMPLE]

SNOW REMOVAL MACHINE

INCORPORATION BY REFERENCE

The present application claims priority under 35 U.S.C. § 119 to Japanese Patent Application No. 2017-148090 filed on Jul. 31, 2017. The content of the application is incorporated herein by reference in its entirety.

BACKGROUND OF THE INVENTION

Field of the Invention

The present invention relates to a snow removal machine.

Description of the Related Art

In a conventionally-known snow removal machine, a chute guide is pivotably provided on a distal end portion of a chute, and the chute guide is provided with a light projector for illuminating a dropped position of snow (for example, see Japanese Patent Laid-Open No. 61-92205).

In Japanese Patent Laid-Open No. 61-92205, the direction of the chute guide always coincides with the direction of the light projector. However, since snow thrown from the chute guide falls down while describing a parabola, if the snow is thrown to a position considerably away from the chute, the dropped position of the snow largely deviates from the direction of the chute guide. As a result, an illuminating area of the light projector is out of the dropped position of the snow, and therefore the dropped position of the snow cannot be illuminated with the light projector.

An object of the present invention is to provide a snow removal machine capable of illuminating, with a light projector, a dropped position of snow that varies depending on a direction of a chute guide.

SUMMARY OF THE INVENTION

In order to accomplish the above-described object, an aspect of the present invention provides a snow removal machine that includes a machine body, and a chute that is provided on the machine body, and throws away snow, in which the chute includes a chute main body extending upwardly from the machine body, and a chute guide that is pivotably provided on a distal end portion of the chute main body, and adjusts a snow throwing direction that is an up-down direction of the snow to be thrown, the chute guide is connected to the chute main body side through a link, and the link is provided with a light projector so as to be capable of illuminating a dropped position of the snow to be thrown.

According to the present invention, providing the light projector on the link enables a pivoting angle of the link to be smaller than that of the chute guide, thereby making at least part of an illumination area of the light projector coincide with the dropped position of the snow thrown from the chute guide and falling down while describing a parabola. Therefore, the dropped position of the snow can be illuminated with the light projector, thereby confirming a situation of the dropped position of the snow before the snow is thrown and confirming accumulation amount of the snow when the snow is being thrown.

In the above-described invention, the main body side link pivot axis that pivotably supports the link on the chute main body side may be arranged on a side opposite to a pivoting range of the chute guide with respect to the chute guide pivot axis that pivotably supports the chute guide on the chute main body, and may be arranged higher than the chute guide pivot axis.

According to this configuration, the main body side link pivot axis is arranged on the side opposite to the pivoting range of the chute guide with respect to the chute guide pivot axis, and is arranged higher than the chute guide pivot axis, so that the pivoting angle of the link can be smaller than the pivoting angle of the chute guide. As a result, at least part of an illumination area of the light projector coincides with the dropped position of the snow thrown from the chute guide and falling down while describing a parabola.

In the above-described invention, a headlight is provided on the machine body, the chute is arranged to be offset in either a left or a right direction with respect to the headlight, and the light projector is arranged on an opposite side to the headlight across the chute.

According to this configuration, the headlight and the light projector can illuminate a wide area including forward of the snow removal machine.

In the above-described invention, the headlight is arranged to be offset in a rearward direction with respect to the chute.

According to this configuration, the illuminating area forward of the snow removal machine can be compensated by the headlight and the light projector, and therefore a wide area forward of the snow removal machine can be illuminated.

In the above-described invention, the link is arranged on either a left or a right side of the chute guide, and the light projector is provided to project from the link sideways.

According to this configuration, the light projector can be arranged away from the chute guide sideways, and the light projector can illuminate forward without being blocked by the chute guide and the link.

In the above-described invention, the chute guide includes a lower chute guide that is pivotably supported on an upper end portion of the chute main body, and an upper chute guide that is pivotably supported on an upper end portion of the lower chute guide, and the link connects between the chute main body side and the upper chute guide.

According to this configuration, the pivoting angle of the link can be smaller than the pivoting angle of the upper chute guide, thereby making at least part of an illumination area of the light projector coincide with the dropped position of the snow thrown from the upper chute guide and falling down while describing a parabola.

In the above-described invention, a distance between the main body side link pivot axis and a guide side link pivot axis that pivotably supports the link on the upper chute guide is longer than a distance between the chute guide pivot axis that pivotably supports the lower chute guide on the chute main body and an upper chute guide pivot axis that pivotably supports the upper chute guide on the lower chute guide.

According to this configuration, the distance between the pair of pivot axes of the link is longer than the distance between the chute guide pivot axis and the upper chute guide pivot axis, so that the pivoting angle of the link can be smaller than the pivoting angle of the upper chute guide, thereby making at least part of an illumination area of the light projector coincide with the dropped position of the snow thrown from the upper chute guide and falling down while describing a parabola.

In the above-described invention, the light projector is mounted on the link at an angle at which light is emitted in a substantially horizontal direction so as to include the dropped position of the snow in a state where the upper chute guide is directed to the most upward direction.

According to this configuration, the light projector can illuminate the dropped position of the snow and a wide area surrounding the same, thereby enabling the human operator to easily grasp the situation of the position considerably away from the snow removal machine when the snow is thrown.

According to the aspect of the present invention, providing a light projector on a link enables a pivoting angle of the link to be smaller than that of the chute guide, thereby making at least part of an illumination area of the light projector coincide with the dropped position of the snow thrown from the chute guide and falling down while describing a parabola. Therefore, the dropped position of the snow can be illuminated with the light projector, thereby confirming a situation of the dropped position of the snow before the snow is thrown and confirming accumulation amount of the snow when the snow is being thrown.

BRIEF DESCRIPTION OF THE DRAWINGS

FIGS. 4(A) and 4(B) are views for explaining a mounting structure of a light projector, in which FIG. 4(A) is a view illustrating a middle state of mounting the light projector on the link, and FIG. 4(B) is a view illustrating a state where the light projector is mounted on the link;

FIGS. 5(A), 5(B), 5(C), 5(D), and 5(E) are views illustrating each component and an assembled state of a mounting fitting set used for mounting on the link, in which FIG. 5(A) is a perspective view of a U-shaped metal fitting, FIG. 5(B) is a view viewing from an arrow direction of B of FIG. 5(A), FIG. 5(C) is a perspective view of a fastening metal fitting, FIG. 5(D) is a view viewing from an arrow direction of D of FIG. 5(C), and FIG. 5(E) is a view illustrating a mounted state on the link viewing from the same direction as the arrow B;

DETAILED DESCRIPTION OF THE PREFERRED EMBODIMENTS

Hereinafter, embodiments of the present invention will be described with reference to the drawings.

First Embodiment

Figure 1:
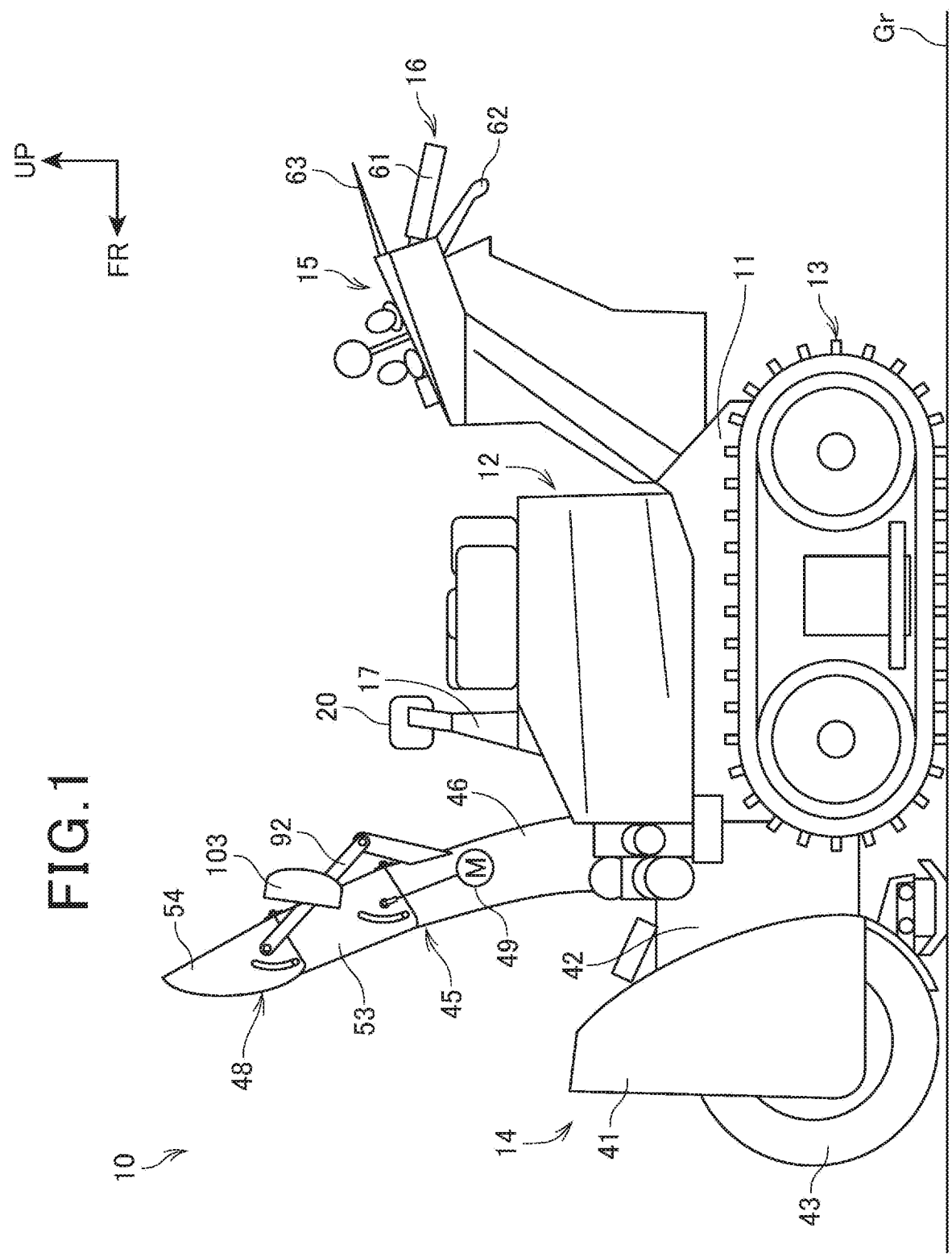
FIG. 1 is a side view illustrating a working machine according to a first embodiment of the present invention.
Figure 2:
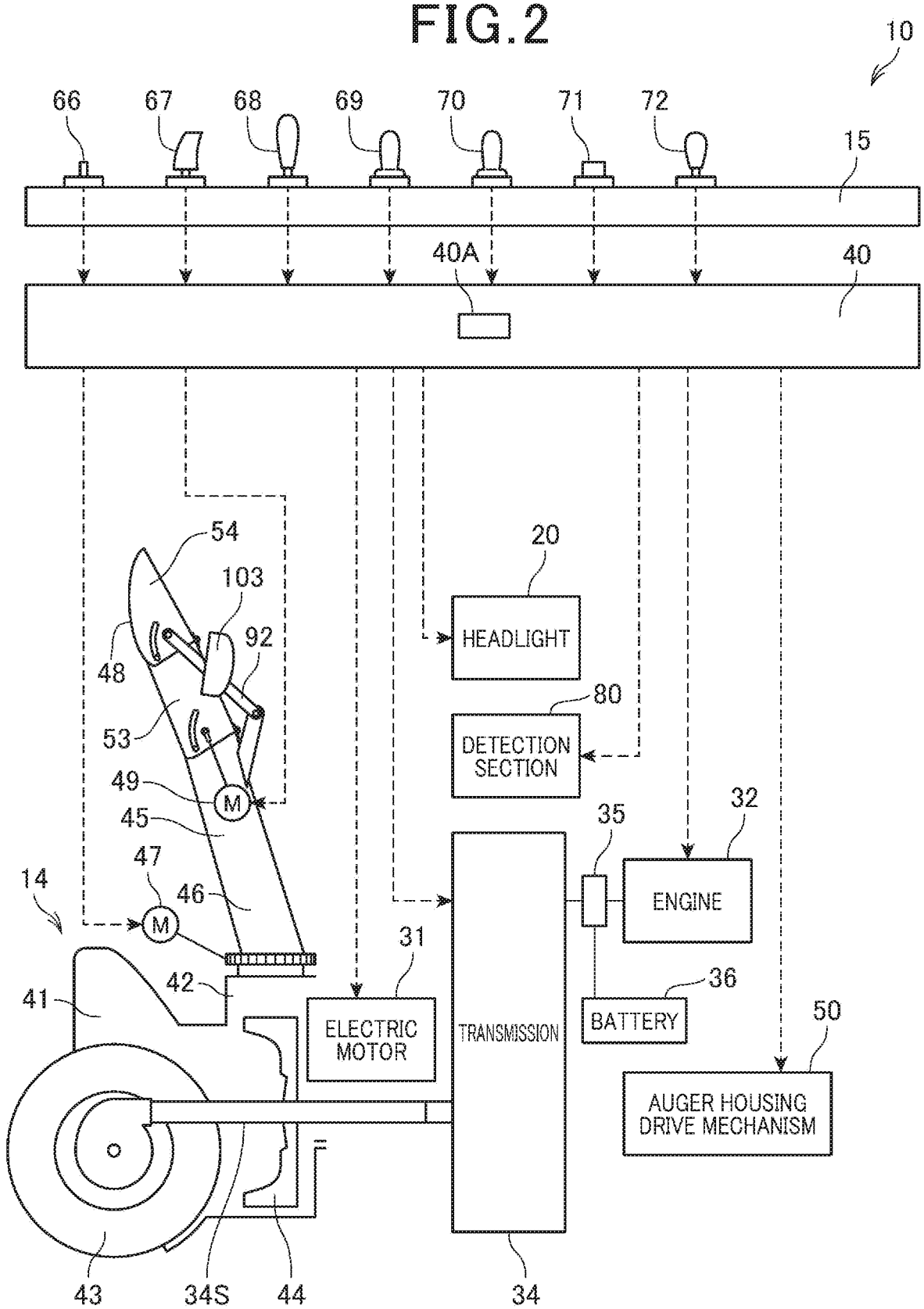
FIG. 2 is a schematic view schematically illustrating a configuration of the working machine.

FIG. 1 is a side view illustrating a working machine 10 according to a first embodiment of the present invention, and FIG. 2 is a schematic view schematically illustrating a configuration of the working machine 10.

Note that, in the following description, directions such as forward, rearward, leftward, rightward, upward and downward directions indicate directions with respect to the working machine 10. In the figures, a reference character FR denotes a forward direction of the working machine 10, a reference character UP denotes an upward direction of the working machine 10, and a reference character LH denotes a leftward direction of the working machine 10.

As illustrated in FIG. 1, the working machine 10 is a self-propelled snow removal machine (also referred to as a "walk-behind snow removal machine") includes a machine body 11, a drive source 12 mounted on the machine body 11, a travel unit 13, a snow removal work section 14, and an operation panel 15 (also referred to as an "operation device").

Operating handles 16 extend obliquely rearwardly and upwardly from a rear portion of the machine body 11. A human operator (also referred to as a "manipulator", or a "driver") performing the snow removal work grips the operating handles 16 at the rear portion of the working machine 10, and manipulates or operates the working machine 10 while walking behind the working machine 10.

The drive source 12 is provided in a center in a front-rear direction of the working machine 10, and a pair of arms 17 is erected from a front upper portion of the drive source 12 with an interval in a left-right direction. A headlight 20 for illuminating with the illumination light is supported on upper ends of the left and right arms 17. The headlight 20 is arranged more rearward than the snow removal work section 14 arranged in a front portion of the machine body 11 (including an auger housing 41, a chute 45 and the like that are described later) and more upward than the auger housing 41, and is arranged at a position deviated in the left-right direction with respect to a chute 45.

Thus, the headlight 20 can illuminate forward of the working machine 10 (forward of the auger housing 41) with the illumination light while avoiding the chute 45.

The drive source 12 is adapted to drive the travel unit 13 and the snow removal work section 14, and includes electric motors 31 and an engine 32 that are illustrated in FIG. 2. The electric motors 31 drive the travel unit 13 under control of a control section 40 illustrated in FIG. 2. The travel unit 13 includes a pair of crawlers provided with an interval in the left-right direction, and the left and right crawlers are driven by the respective different electric motors 31 through a deceleration mechanism.

The engine 32 drives the snow removal work section 14 through a transmission 34 under control of the control section 40. A power generator 35 is provided on a driving shaft of the engine 32. The electric power generated by the power generator 35 is supplied to electric components such as a battery 36, the electric motors 31, and the headlight 20 that are included in the working machine 10. Note that the travel unit 13 may be configured to be driven by the engine 32.

As illustrated in FIG. 1 and FIG. 2, the snow removal work section 14 includes the auger housing 41, a blower housing 42 that is connected to a rear portion of the auger housing 41, and an auger 43 that is housed in the auger housing 41, and a blower 44 that is housed in the blower housing 42, and the chute 45 that extends upwardly from an upper portion of the blower housing 42.

The auger housing 41 is a cover that covers an upper portion, a rear portion, and both left and right sides of the auger 43 so that front and lower portions of the auger 43 are exposed to the outside of the auger housing 41.

The auger 43 is rotationally driven by rotation of an output shaft 34S of the transmission 34, and gathers snow in front of the working machine 10. The blower 44 throws away the snow gathered by the auger 43, and supplies the snow to the chute 45. The snow supplied to the chute 45 is guided upwardly by the chute 45, and is thrown to a position considerably away from the chute 45. Namely, the chute 45 functions as a snow throwing section that throws the snow gathered by the auger 43 to a position considerably away from the working machine 10.

The chute 45 is provided in such a manner that it is rotatable around an axis extending in a vertical direction relative to a ground surface Gr the travel unit 13 is contacting (corresponding to a travelling surface on which the working machine 10 travels), and is rotationally driven by a chute driving motor 47. In response to the rotation of the chute 45, a snow throwing direction is adjustable to a desired direction of the forward, rearward, leftward or rightward direction.

A chute guide 48 is provided on an upper end portion of the chute 45. The chute guide 48 is vertically pivotably mounted so as to be able to adjust the snow throwing direction in an up-down direction (i.e., a snow throwing angle). The snow throwing angle of the chute guide 48 is controlled by a guide driving motor 49.

As illustrated in FIG. 1, the working machine 10 gathers the snow by means of the auger 43 on a front portion while traveling forward by the travel unit 13, and can throw away the gathered snow by the blower 44 through the chute 45.

The working machine 10 includes an auger housing drive mechanism 50 that changes a posture of the auger housing 41. The auger housing drive mechanism 50 includes an up-down drive mechanism that drives the auger housing 41 in the up-down direction with respect to the machine body 11, and a rolling drive mechanism that drives to roll the auger housing 41 with respect to the machine body 11. Thus, a height of the auger housing 41 can be changed and the left-right direction of the auger housing 41 can be changed. In this case, the auger 43 is moved together with the auger housing 41.

The control section 40 has a CPU (Central Processing Unit) (not illustrated) and a memory 40A (see FIG. 2) that stores a program and various data, and controls each component of the working machine 10 by executing, by the CPU, the program stored in the memory 40A. The control section 40 is arranged in the vicinity of the operation panel 15.

As illustrated in FIG. 1, each of the operating handles 16 include a grip 61 that is gripped by the human operator, and a corresponding one of a pair of left and right turning operation levers 62. Furthermore, the left operating handle 16 includes a travel preparation lever 63.

The control section 40 permits drive of the travel unit 13 and the snow removal work section 14 under a condition that the human operator performs a predetermined operation (operation of gripping the travel preparation lever 63 and lowering the travel preparation lever 63 to the grip 61 side). When the human operator gripping the left or right turning operation lever 62, the control section 40 controls the travel unit 13 to turn the working machine 10 to a direction of the turning operation lever which is gripped.

As illustrated in FIG. 2, the operation panel 15 includes a main switch 66, a throttle lever 67, a direction speed lever 68, an auger housing lever 69, a chute operation lever 70, an auger switch 71, and a target working speed setting section 72.

The main switch 66 is a manual operator that turns on an electric system and starts the engine 32. The throttle lever 67 is a manual operator for controlling a rotational speed of the engine 32. The direction speed lever 68 is a manual operator for controlling rotation of the left and right travel unit 13.

The auger housing lever 69 is a manual operator for operating or manipulating the auger housing drive mechanism 50 in such a manner that the auger housing 41 is movable up or down and rollable in accordance with the surface of snow when the snow removal work is performed by the auger 43. The chute operation lever 70 is an operation member for changing orientations of the chute 45 and the chute guide 48 by the chute driving motor 47 and the guide driving motor 49.

The auger switch 71 is a manual operator for switching an electromagnetic clutch (not illustrated) that is provided in a power transmission path between the auger 43 and the engine 32, and enables the power transmission if the auger switch 71 is turned on and cuts off the power transmission if the auger switch 71 is turned off. That is, the travel preparation lever 63 is lowered to the grip 61 side, and the auger switch 71 is operated to be on, whereby the control section 40 can drive the auger 43 and the blower 44 by the power of the engine 32.

The target working speed setting section 72 is a manual operator for setting a target working rotational speed of the snow removal work section 14. Since a snow throwing distance from the chute 45 is determined in accordance with a rotational speed of the blower 44, the snow throwing distance from the chute 45 is set by setting the target working rotational speed of the snow removal work section 14. That is, the target working speed setting section 72 is also a manual operator for setting the snow throwing distance (a snow throwing distance lever).

The working machine 10 includes a detection section 80 that detects information required for the control section 40 to control each component of the working machine 10.

That is, the detection section 80 includes sensors for detecting the information on each component included in the working machine 10 (in this configuration, the rotational speed of the snow removal work section 14 (the rotational speed of the auger 43), the rotational speed of the engine 32, the height of the auger housing 41, and an inclination angle of auger housing 41 with respect to a direction of gravitational force, a rolling position of the auger housing 41, and the like). Sensors included in the conventional snow removal machine can be applied to these sensors.

Figure 3:
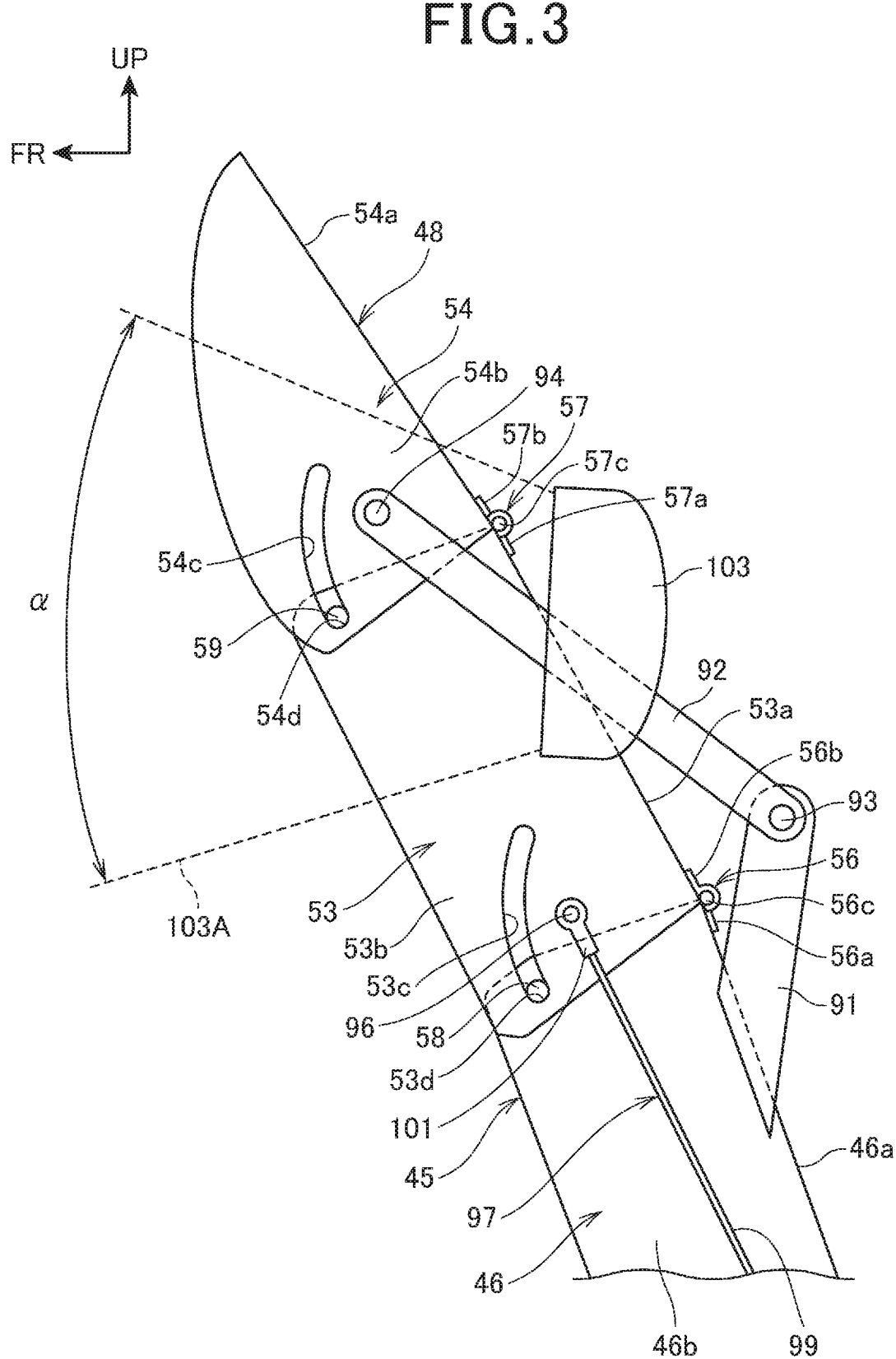
FIG. 3 is a side view illustrating a chute.

FIG. 3 is a side view illustrating the chute 45.

The chute 45 includes a chute main body 46 that is turnably mounted on the upper portion of the blower housing 42 (see FIG. 1), and the chute guide 48 that is pivotably provided on an upper end portion of the chute main body 46.

The chute main body 46 is a member having a U-shaped cross section that comprises a rear wall 46a, and a pair of left and right side walls 46b extending forwardly from both left and right edges of the rear wall 46a, respectively, so that the front side of the chute main body 46 is opened.

The chute guide 48 includes a lower chute guide 53 that is pivotably mounted to the upper end portion of the chute main body 46, and an upper chute guide 54 that is pivotably mounted to the upper end portion of the lower chute guide 53.

The lower chute guide 53 is a member having a U-shaped cross section that comprises a rear wall 53a, and a pair of left and right side walls 53b extending forwardly from both left and right edges of the rear wall 53a, respectively, so that the front side of the lower chute guide 53 is opened. A hinge 56 is attached between the lower end portion of the rear wall 53a and the upper end portion of the rear wall 46a of the chute main body 46 so that the rear wall 53a is pivotably connected to the rear wall 46a of the chute main body 46.

The hinge 56 includes one side hinge portion 56a that is attached to the rear wall 46a, the other side hinge portion 56b that is attached to the rear wall 53a, and a hinge shaft 56c that pivotably connects between the one side hinge portion 56a and the other side hinge portion 56b. Therefore, the rear wall 53a is pivotable around the hinge shaft 56c.

The upper chute guide 54 is a member having a U-shaped cross section that comprises a rear wall 54a, and a pair of left and right side walls 54b extending forwardly from both left and right edges of the rear wall 54a, respectively, so that the front side of the upper chute guide 54 is opened. A hinge 57 is attached between the lower end portion of the rear wall 54a and the upper end portion of the rear wall 53a of the lower chute guide 53 so that the rear wall 54a is pivotably connected to the rear wall 53a of the lower chute guide 53.

The hinge 57 includes one side hinge portion 57a that is attached to the rear wall 53a, the other side hinge portion 57b that is attached to the rear wall 54a, and a hinge shaft 57c that pivotably connects between the one side hinge portion 57a and the other side hinge portion 57b. Therefore, the rear wall 54a is pivotable around the hinge shaft 57c.

A pair of left and right stopper pins 58 extending sideways from the left and right side walls 46b, respectively are provided on the front side of the upper end portion of the chute main body 46. A pair of left and right arc-shaped guide holes 53c for inserting the above-described left and right stopper pins 58, respectively, is opened in the front side of the lower portion of the left and right side walls 53b in the lower chute guide 53.

A vertical pivotable range of the lower chute guide 53 with respect to the chute main body 46 is regulated by inserting the left and right stopper pins 58 into the left and right arc-shaped guide holes 53c, respectively.

A pair of left and right stopper pins 59 extending sideways from the left and right side walls 53b, respectively are provided on the front side of the upper end portion of the lower chute guide 53. A pair of left and right arc-shaped guide holes 54c for inserting the above-described left and right stopper pins 59, respectively, is opened in the front side of the lower portion of the left and right side walls 54b in the upper chute guide 54.

A vertical pivotable range of the upper chute guide 54 with respect to the lower chute guide 53 is regulated by inserting the left and right stopper pins 59 into the left and right arc-shaped guide holes 54c, respectively.

A link support portion 91 is provided on at least one of the rear wall 46a and one of the side walls 46b in the chute main body 46, and the link 92 connects between the distal end portion of the link support portion 91 and one of side walls 54b of the upper chute guide 54.

One end of the link 92 is pivotably connected to the link support portion 91 through a connection pin 93, and the other end of the link 92 is pivotably connected to the side wall 54b of the upper chute guide 54 through a connection pin 94.

The connection pin 93 at the one end of the link 92 is arranged obliquely rearwardly and upwardly spaced apart from the hinge 56.

A tension coil spring (not illustrated) is arranged between the chute main body 46 or the link support portion 91 and the upper chute guide 54 (more specifically, the rear wall 54a or one of the side walls 54b). This tension coil spring pulls the rear portion of the upper chute guide 54 with respect to the chute main body 46 or the link support portion 91 side, thereby maintaining the most upwardly extending state of the chute guide 48 as illustrated. At this time, the lower end portions 53d of the left and right arc-shaped guide holes 53c are brought into contact with the left and right stopper pins 58, respectively, and the lower end portions 54d of the left and right arc-shaped guide holes 54c are brought into contact with the left and right stopper pins 59.

A connection pin 96 is attached to one of the side walls 53b of the lower chute guide 53, and a cable 97 is connected to the connection pin 96.

The cable 97 includes an outer cable (not illustrated) and an inner wire 99 that is movably inserted into the outer cable. Both ends of the outer cable are attached to the side wall 46b of the chute main body 46. One end of the inner wire 99 is pivotably connected to the connection pin 96 through an end member 101, and the other end of the inner wire 99 is connected to the guide driving motor 49 side (see FIG. 2).

The link 92 is provided with a light projector 103 on the side surface thereof, the light projector 103 illuminating forward or lateral side of the working machine 10 (see FIG. 1), more specifically, a place to which snow is to be thrown (snow throwing position). A character a indicated in FIG. 3 represents an illumination angle in the up-down direction of illumination light 103A emitted from the light projector 103.

FIGS. 4(A) and 4(B) are views for explaining a mounting structure of the light projector 103.

FIG. 4(A) is a view illustrating a middle state of mounting the light projector 103 on the link 92, and FIG. 4(B) is a view illustrating a state where the light projector 103 is mounted on the link 92.

Figure 5A:
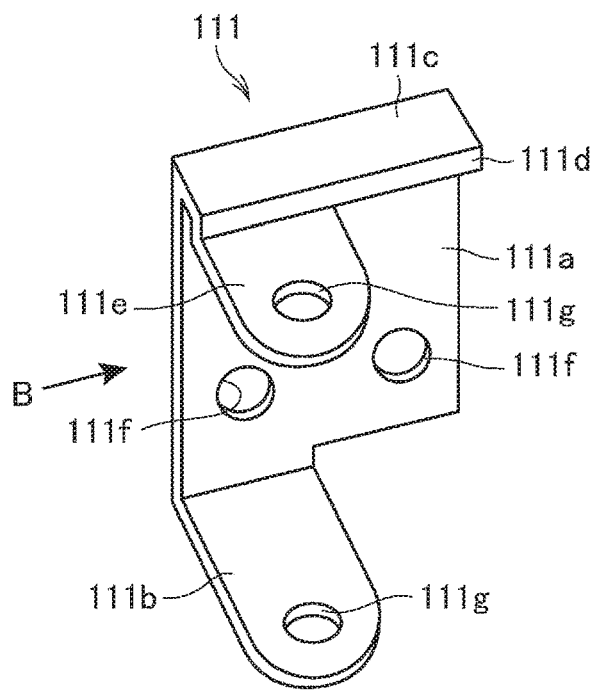
Figure 5B:
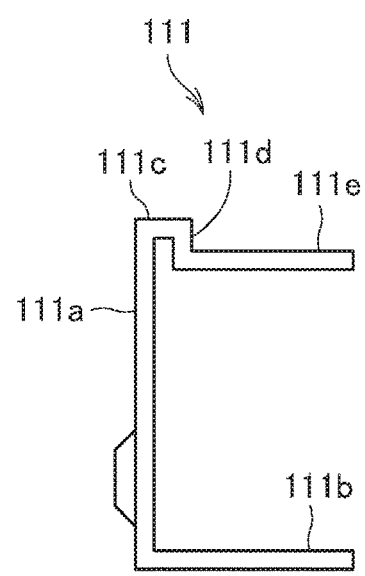
Figure 5C:
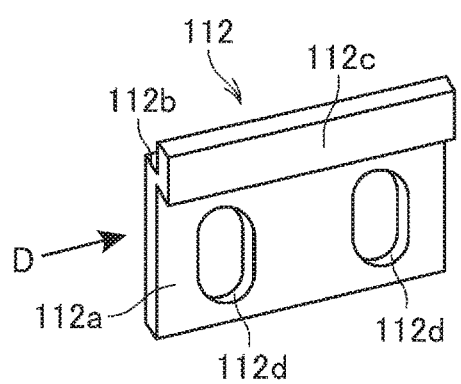
Figure 5D:
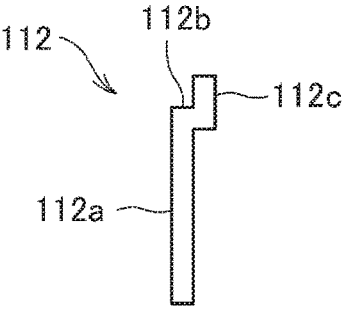
Figure 5E:
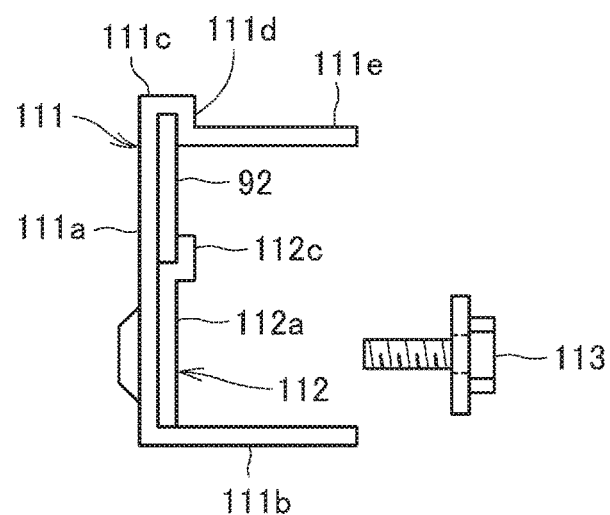

FIGS. 5(A), 5(B), 5(C), 5(D), and 5(E) are views illustrating each component and an assembled state of a mounting fitting set 105 used for mounting on the link 92. FIG. 5(A) is a perspective view of a U-shaped metal fitting 111, FIG. 5(B) is a view viewing from an arrow direction of B of FIG. 5(A), FIG. 5(C) is a perspective view of a fastening metal fitting 112, FIG. 5(D) is a view viewing from an arrow direction of D of FIG. 5(C), and FIG. 5(E) is a view illustrating a mounted state on the link 92 viewing from the same direction as the arrow B.

As illustrated in FIGS. 4(A) and 4(B), the light projector 103 is mounted on the link 92 using the mounting fitting set 105.

Pin insertion holes 92a, 92a into which the connection pins 93, 94 (see FIG. 3) are to be inserted are opened in both end portions of the link 92.

The mounting fitting set 105 includes the U-shaped metal fitting 111, the fastening metal fitting 112, a pair of fastening bolts 113, a pair of extension plates 114, and a pair of connecting bolts 116.

As illustrated in FIGS. 5(A) and 5(B), the U-shaped metal fitting 111 integrally includes a bottom wall 111a, an arm portion 111b, a side wall 111c, a folding portion 111d, and an arm portion 111e.

The arm portion 111b is erected from one edge of the bottom wall 111a. The side wall 111c is erected from the other edge of the bottom wall 111a. The folding portion 111d is folded from an edge of the side wall 111c to the arm portion 111b side. The arm portion 111e is erected from an edge of the folding portion 111d so as to be parallel to the above-described arm portion 111b.

A pair of threaded holes 111f into which the pair of fastening bolts 113 is to be screwed is formed in positions closer to the arm portion 111b in the bottom wall 111a. A threaded hole 111g into which the connecting bolt 116 is to be screwed is formed in each of distal end portions of the pair of arm portions 111b, 111e.

Note that bolt insertion holes may be formed on the bottom wall 111a instead of the pair of threaded holes 111f so that nuts are fitted on an outer surface of the bottom wall 111a so as to be aligned with the corresponding bolt insertion holes, and the fastening bolts 113 are screwed into the corresponding nuts. Furthermore, bolt insertion holes may be formed instead of the threaded holes 111g, so that a nut is fitted on each of inner surfaces of the arm portions 111b, 111e so as to be aligned with the corresponding bolt insertion hole, and the connecting bolt 116 is screwed into the corresponding nut.

As illustrated in FIGS. 5(C) and 5(D), the fastening metal fitting 112 integrally includes a flat plate portion 112a, a rising portion 112b, and a stepped portion 112c.

The flat plate portion 112a is formed to be flat, and a pair of elongated holes 112d is open in the flat plate portion 112a. The rising portion 112b extends from one edge of the flat plate portion 112a. The stepped portion 112c is folded from an edge of the rising portion 112b so as to be parallel to the flat plate portion 112a and have a step higher than the flat plate portion 112a.

The elongated hole 112d in the flat plate portion 112a is formed to have a long axis extending in a direction orthogonal to an extending direction of the stepped portion 112c.

As illustrated in FIGS. 4(A) and 4(B), one ends of the respective extension plates 114 are previously attached to both side surfaces of the light projector 103 with the bolts 121 and nuts (not illustrated), respectively, and the bolt insertion holes 114a are opened on the other ends thereof, respectively.

A mounting procedure of the light projector 103 on the link 92 described above will be described below.

As illustrated in FIG. 5(E), one edge (upper edge) of the link 92 is inserted between the bottom wall 111a and the folding portion 111d of the U-shaped metal fitting 111.

Then, the other edge (lower edge) of the link 92 is sandwiched between the bottom wall 111a of the U-shaped metal fitting 111 and the stepped portion 112c of the fastening metal fitting 112, and the flat plate portion 112a of the fastening metal fitting 112 is applied to the bottom wall 111a of the U-shaped metal fitting 111.

The pair of fastening bolts 113 are inserted into the pair of elongated holes 112d (see FIG. 5(C)) in the fastening metal fitting 112, respectively, and are screwed into the pair of threaded holes 111f (see FIG. 5(A)) in the U-shaped metal fitting 111, respectively. At this time, the pair of elongated holes 112d in the fastening metal fitting 112 enable the fastening metal fitting 112 to be slid to be closer to the side wall 111c side of the U-shaped metal fitting 111, thereby capable of fastening the fastening metal fitting 112 to the U-shaped metal fitting 111 without looseness between the U-shaped metal fitting 111 and the fastening metal fitting 112 and both edges of the link 92. Thus, the U-shaped metal fitting 111 and the fastening metal fitting 112 are completely mounted on the link 92.

As illustrated in FIG. 4(A), the pair of connecting bolts 116 is inserted into the bolt insertion holes 114a in the pair of extension plates 114, respectively, and is screwed into the threaded holes 111g in the pair of arm portions 111b, 111e, respectively. Thus, the light projector 103 is completely mounted on the link 92.

Since the pair of extension plates 114 are attached to the U-shaped metal fitting 111 with the pair of connecting bolts 116, the pair of connecting bolts 116 can be loosened, thereby adjusting the angle of the light projector 103 in the left-right direction together with the pair of extension plates 114 by making the light projector 103 pivot in the front-rear direction with respect to the link 92.

The operation of adjusting the snow throwing direction of the chute 45 and the illuminating direction of the light projector 103 described above will be described below.

Figure 6:
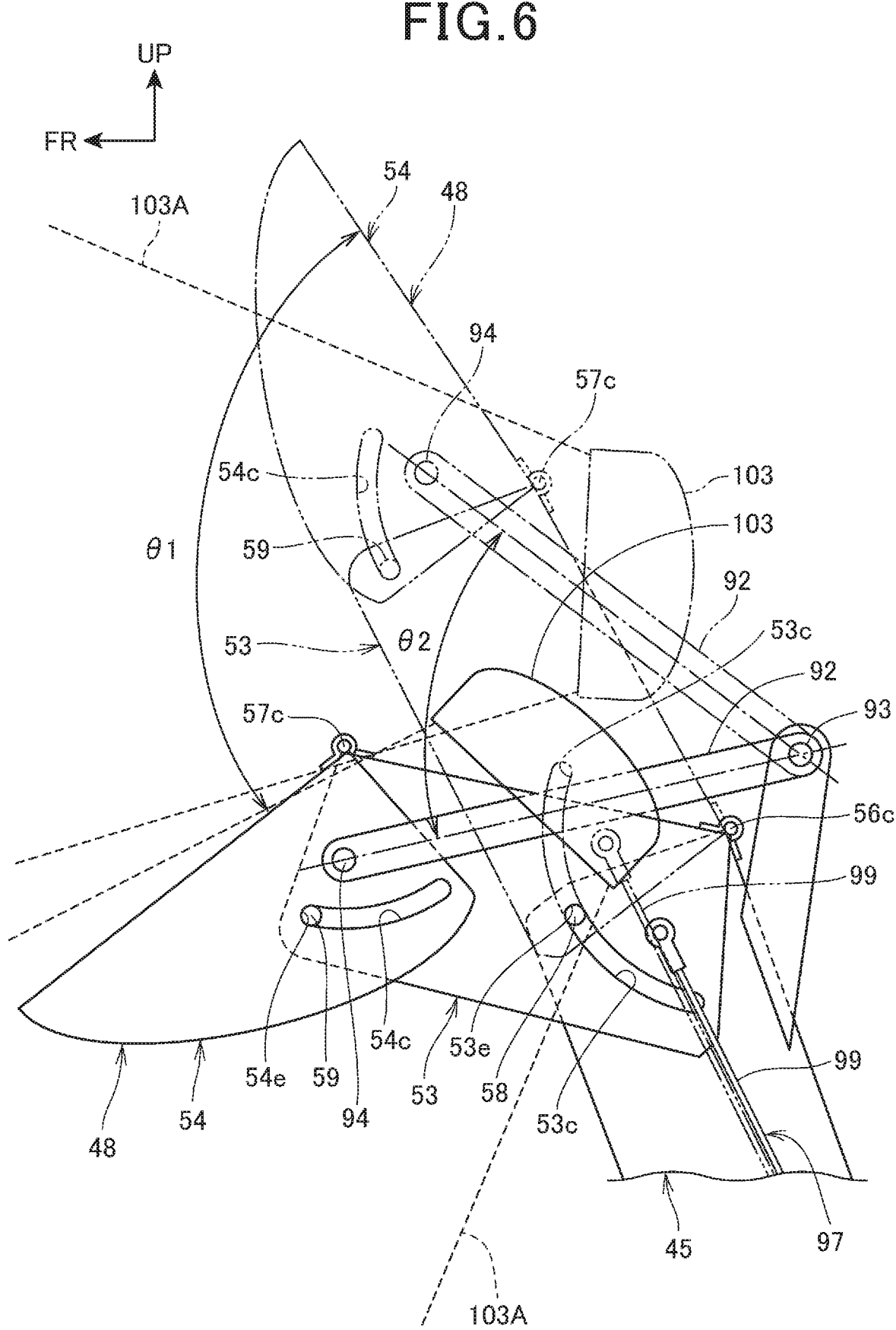
FIG. 6 is a diagram illustrating the operation of adjusting the snow throwing direction of the chute and the illuminating direction of the light projector.

FIG. 6 is a diagram illustrating the operation of adjusting the snow throwing direction of the chute 45 and the illuminating direction of the light projector 103.

Note that an initial state of the chute 45 (a state where snow can be thrown to the farthest position) is represented by an imaginary line, and a state after adjusting the snow throwing direction of the chute 45 (a state where snow can be thrown to the closest position) is represented by a solid line.

In the state where the chute guide 48 of the chute 45 is directed to the most upward direction (namely, a state where snow can be thrown to the farthest position), an optical axis of the light projector 103 extends in a horizontal direction or a substantially horizontal direction (almost horizontal direction). That is, the optical axis of the light projector 103 extends along the horizontal direction, and the light projector 103 itself is mounted on the link 92 at an angle at which the light is emitted along the horizontal direction.

To incline the chute guide 48 of the chute 45 forwardly from the state where the chute guide 48 is directed to the most upward direction (namely, a state where snow can be thrown to the farthest position), the guide driving motor 49 (see FIG. 2) is operated to pull the inner wire 99 of the cable 97 downwardly.

Thus, the lower chute guide 53 of the chute guide 48 pivots forwardly on the hinge shaft 56c, and the upper chute guide 54 pivots forwardly on the hinge shaft 57c. At this time, the lower chute guide 53 and the upper chute guide 54 pivot against the elastic force of the tension coil spring (not illustrated).

When the inner wire 99 is pulled by the guide driving motor 49, the lower chute guide 53 further pivots forwardly, and then upper end portions 53e of the left and right arc-shaped guide holes 53c are in contact with the left and right stopper pins 58, respectively, so that the lower chute guide 53 is stopped pivoting forwardly. At this time, the upper chute guide 54 pivots forwardly at an angle larger than the lower chute guide 53 by action of the link 92, and the upper chute guide 54 is stopped pivoting when the lower chute guide 53 is stopped pivoting. At this time, the upper end portions 54e of the left and right arc-shaped guide holes 54c are in contact with or approach the left and right stopper pins 59, respectively.

As described above, when the chute guide 48 is shifted from the state where the chute guide 48 is directed to the most upward direction to the state where the chute guide 48 is inclined most forwardly, the upper chute guide 54 pivots by a pivoting angle (chute guide pivoting angle) θ1, and the link 92 pivots by a pivoting angle (chute guide link pivoting angle) θ2 smaller than the pivoting angle θ1. That is, the pivoting angle (illuminating angle) θ2 of the light projector 103 mounted on the link 92 can be smaller than the pivoting angle θ1 of the upper chute guide 54.

The illumination light 103A of the light projector 103 is emitted in the horizontal direction in the state where the chute guide 48 is directed to the most upward direction, and is emitted in a forward and obliquely downward direction in the state where the chute guide 48 is inclined most forwardly.

As illustrated in FIG. 3 and FIG. 6, the chute guide 48 includes the lower chute guide 53 that is pivotably supported on the upper end portion of the chute main body 46, and the upper chute guide 54 that is pivotably supported on the upper end portion of the lower chute guide 53. The link 92 connects between the chute main body 46 side and the upper chute guide 54. According to this configuration, the pivoting angle θ2 of the link 92 can be smaller than the pivoting angle θ1 of the upper chute guide 54, and the dropped position of the snow thrown from the upper chute guide 54 and falling down while describing a parabola can be within an illumination area of the light projector 103.

Figure 7:
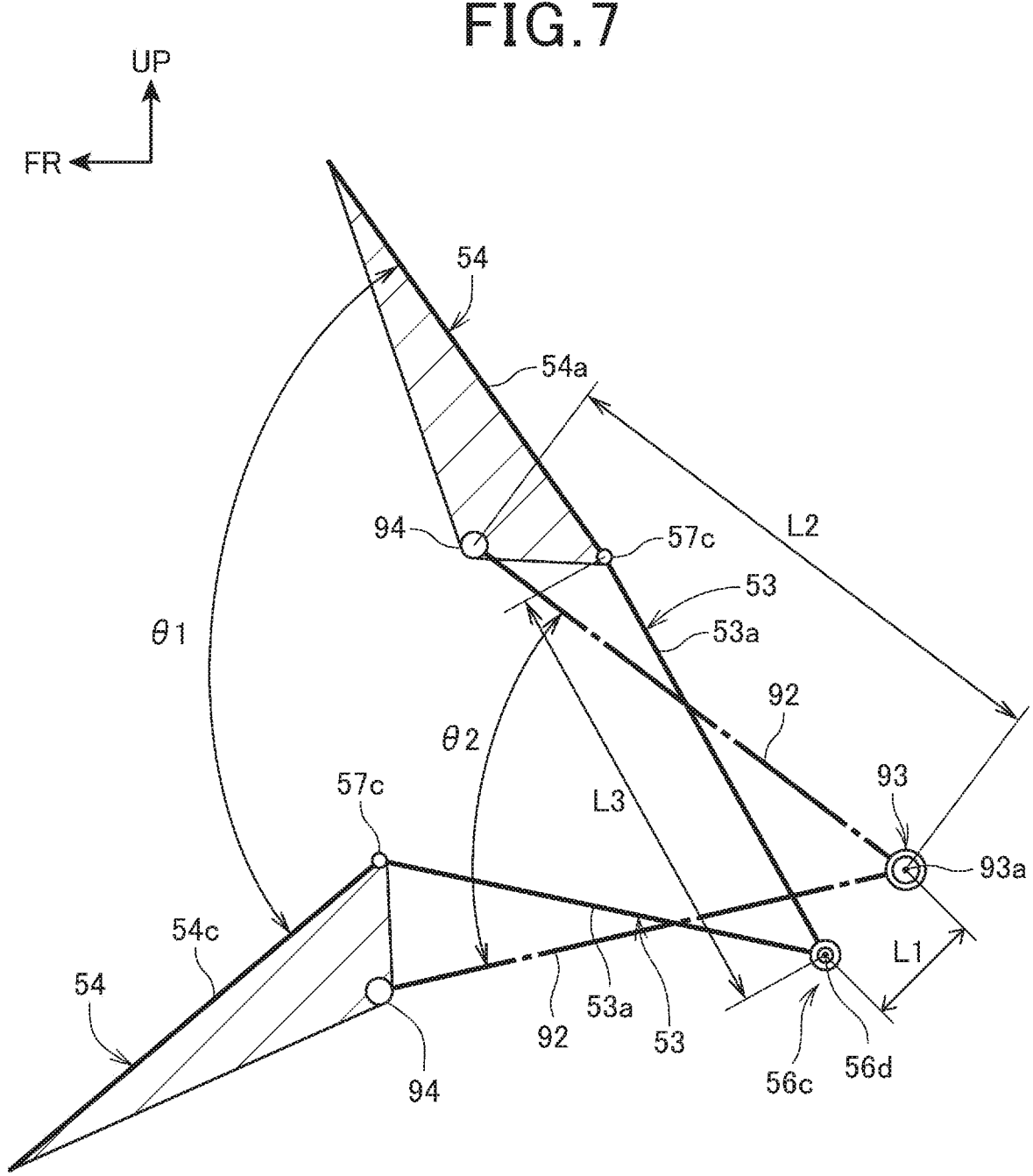
FIG. 7 is a schematic diagram illustrating the pivoting operation of a chute guide illustrated in FIG. 6.

FIG. 7 is a schematic diagram illustrating the pivoting operation of the chute guide 48 illustrated in FIG. 6.

In FIG. 7, the rear wall 53a of the lower chute guide 53 illustrated in FIG. 6 is represented by a thick solid straight line, the upper chute guide 54 is represented by a triangle shape (hatched portion), and the rear wall 54a is represented by a thick solid straight line. The link 92 illustrated in FIG. 6 is represented by a thick dashed-dotted line. A pivot point is represented by a circular mark, and the hinge shaft 56c and the connection pin 93 are represented by a double circular mark, in particular.

As illustrated in FIG. 7, it can be understood that the upper chute guide 54 is supported by two link members (the rear wall 53a and the link 92).

That is, the hinge shaft 57c that is positioned at a rear portion of the upper chute guide 54 is pivotably supported by the rear wall 53a extending from the hinge shaft 56c, and the connection pin 94 that is positioned at a front portion of the upper chute guide 54 is pivotably supported by the link 92 extending from the connection pin 93.

The connection pin 93 is arranged rearwardly and upwardly, i.e., rearwardly and obliquely forwardly, with respect to the hinge shaft 56c, and an axis line 93a of the connection pin 93 is separated from an axis line 56d of the hinge shaft 56c by a distance L1. When denoting a distance between the pair of connection pins 93, 94 that are pivot axes at both ends of the link 92 as L2, and denoting a distance between the pair of hinge shafts 56c, 57c as L3, the distance L2 is longer than the distance L3 (L2>L3).

When focusing on the hinge shaft 57c and the connection pin 94 of the upper chute guide 54, the hinge shaft 57c is moved in a forward and obliquely downward direction and the connection pin 94 is moved in a downward direction when the upper chute guide 54 is inclined most forwardly from the upper position. When the upper chute guide 54 is at the upper position, the hinge shaft 57c and the connection pin 94 are positioned at an approximately same height, but when the upper chute guide 54 is inclined most forwardly, the connection pin 94 is positioned lower than the hinge shaft 57c. That is, a moving distance in the up-down direction of the connection pin 94 is longer than that of the hinge shaft 57c.

Thus, the whole upper chute guide 54 largely pivots forwardly with respect to the rear wall 53a. That is, since the rear wall 54a of the upper chute guide 54 largely pivots forwardly, the pivoting angle θ1 of the rear wall 54a of the upper chute guide 54 is larger than the pivoting angle θ2 of the link 92.

Figure 8:
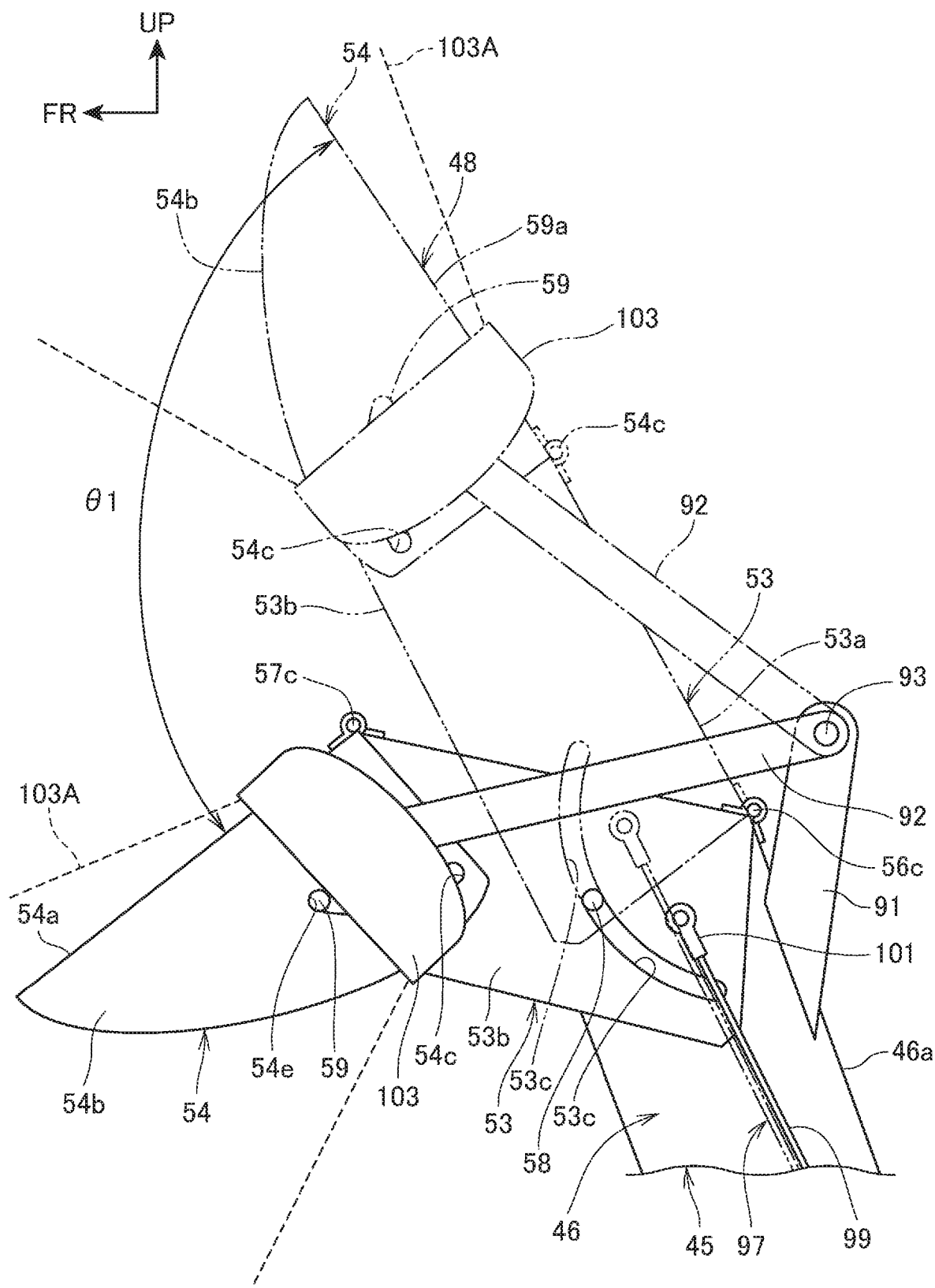
FIG. 8 is a side view illustrating a comparative example in which the light projector is mounted on the chute guide.

FIG. 8 is a side view illustrating a comparative example in which the light projector 103 is mounted on the chute guide 48.

The same signs are assigned to the same components as those in the embodiment illustrated in FIG. 3 and FIG. 6, and the detailed description will be omitted.

The light projector 103 is mounted on one of the side walls 54b of the upper chute guide 54 in the chute guide 48 of the chute 45.

As described in FIG. 6 and FIG. 7, since the upper chute guide 54 pivots by the pivoting angle θ1 in the entire pivoting range from the state where the chute guide 48 extends upwardly to the state where the chute guide 48 is inclined most forwardly, the light projector 103 integrally mounted on the upper chute guide 54 pivots by the same pivoting angle θ1 as the upper chute guide 54.

Thus, in the mounting structure of the light projector 103 in the comparative example, the light projector 103 pivots by the pivoting angle θ1, and in the mounting structure in the present embodiment illustrated in FIG. 6, the light projector 103 pivots by the pivoting angle θ2. That is, the pivoting angle of the light projector 103 in the mounting structure of the present embodiment is smaller than that in the mounting structure of the comparative example.

The relationship between the snow throwing position from the chute 45 and the illuminating position of the light projector 103 will be described below in the comparative example and the example.

Figure 9:
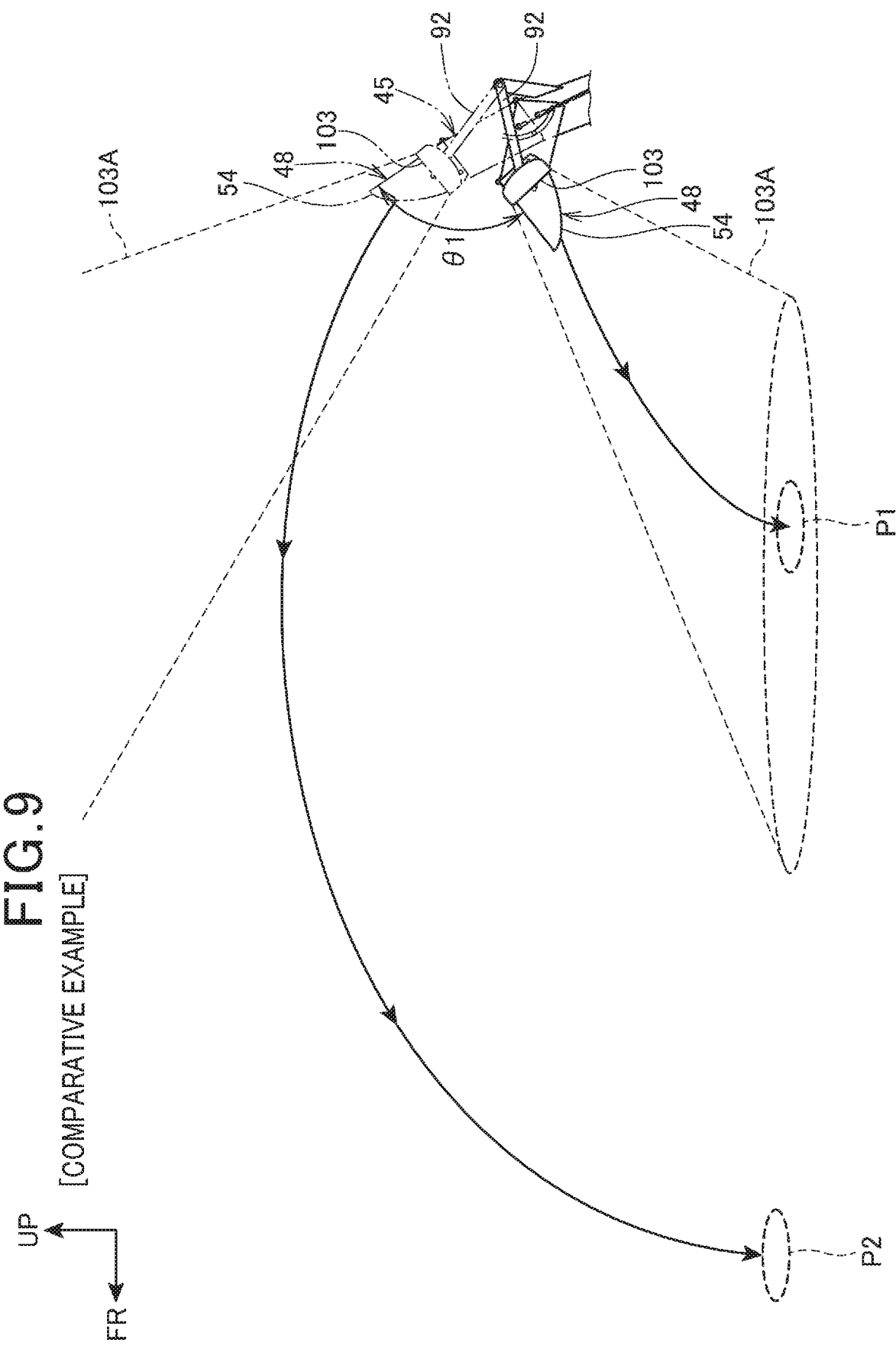
FIG. 9 is a diagram for explaining a relationship between the snow throwing position from the chute and the illuminating position of the light projector when a mounting structure of the light projector in the comparative example is adopted.
Figure 10:
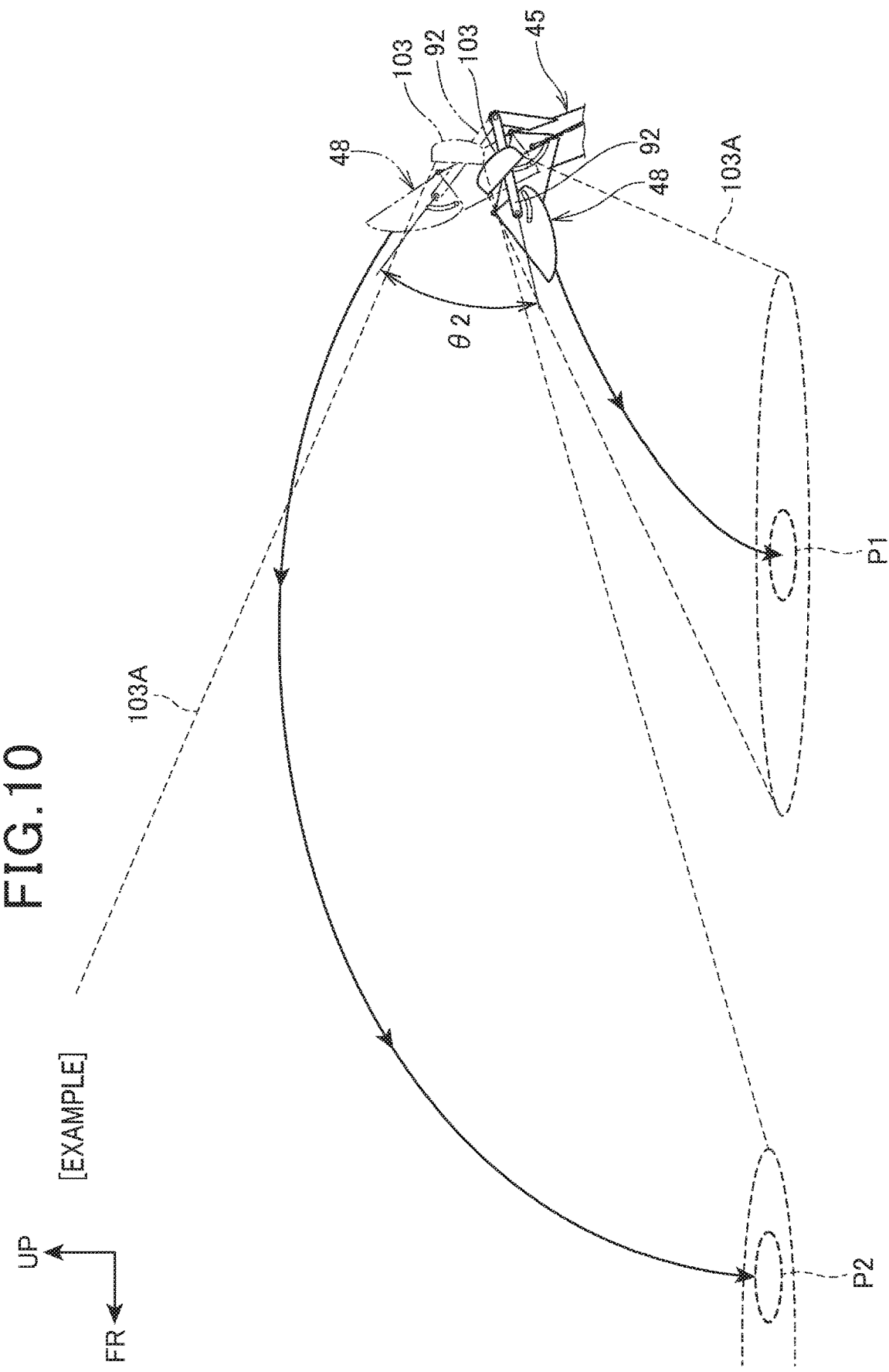
FIG. 10 is a diagram for explaining a relationship between the snow throwing position from the chute and the illuminating position of the light projector when the mounting structure of the light projector in the example is adopted.

FIG. 9 is a diagram for explaining a relationship between the snow throwing position from the chute 45 and the illuminating position of the light projector 103 when the mounting structure of the light projector in the comparative example is adopted. FIG. 10 is a diagram for explaining a relationship between the snow throwing position from the chute 45 and the illuminating position of the light projector 103 when the mounting structure of the light projector in the example is adopted.

In the comparative example illustrated in FIG. 9, when the chute guide 48 of the chute 45 is inclined most downwardly in the entire pivoting range to throw snow from the chute 45 to a vicinity snow throwing position P1 that is closest to the chute 45, the light projector 103 can illuminate the vicinity snow throwing position P1.

However, when the chute guide 48 of the chute 45 is directed to the most upward direction in the entire pivoting range to throw snow from the chute 45 to a distant snow throwing position P2 that is positioned away from the chute 45, the light projector 103 illuminates an upward area of the chute 45, and therefore the distant snow throwing position P2 cannot be illuminated.

When a mounting angle of the light projector 103 with respect to the upper chute guide 54 is changed so that the light projector 103 illuminates the distant snow throwing position P2 even when the chute guide 48 of the chute 45 is directed to the most upward direction, the light projector 103 cannot illuminate the vicinity snow throwing position P1 when the chute guide 48 is inclined most downwardly.

Since snow thrown by the chute 45 falls down while describing a parabola, the snow throwing position is not necessarily present in a direction in which the distal end portion of the chute guide 48 (the upper chute guide 54) is directed, depending on the pivoting angle of the chute guide 48.

Thus, in the structure of the comparative example in which the light projector 103 is directly mounted on the upper chute guide 54, the pivoting angle θ1 in the up-down direction of the light projector 103 is too large, and therefore it is difficult for the light projector 103 to illuminate the dropped position of the snow falling down while describing a parabola.

In the example illustrated in FIG. 10, when the chute guide 48 of the chute 45 is inclined most downwardly in the entire pivoting range to throw snow to the vicinity snow throwing position P1, the light projector 103 can illuminate the vicinity snow throwing position P1.

Furthermore, when the chute guide 48 of the chute 45 is directed to the most upward direction in the entire pivoting range to throw snow to the distant snow throwing position P2, the light projector 103 illuminates area in a horizontal direction or a substantially horizontal direction (almost horizontal direction), and therefore can illuminate the distant snow throwing position P2.

Thus, in the structure of the example in which the light projector 103 is mounted on the link 92, the pivoting angle θ2 (chute guide link pivoting angle) in the up-down direction of the light projector 103 is small, and therefore the light projector 103 can easily illuminate the dropped position of the snow falling down while describing a parabola.

The illuminating positions of the light projector 103 at an upper limit position and a lower limit position of the pivoting range of the chute guide 48 have been described above, but in middle positions in the entire pivoting range of the chute guide 48, the light projector 103 can illuminate each snow throwing position.

As illustrated in FIG. 1, FIG. 9, and FIG. 10, the working machine 10 as the snow removal machine includes the machine body 11, and the chute 45 that is provided on the machine body 11, and throws away snow. The chute 45 includes a chute main body 46 extending upwardly from the machine body 11, and the chute guide 48 that is pivotably provided on a distal end portion of the chute main body 46, and adjusts a snow throwing direction that is an up-down direction of the snow to be thrown, the chute guide 48 is connected to the chute main body 46 through the link 92, and the link 92 is provided with the light projector 103 so as to be capable of illuminating a dropped position of the snow to be thrown.

According to this configuration, providing the light projector 103 on the link 92 enables the pivoting angle θ2 of the link 92 to be smaller than the pivoting angle θ1 of the chute guide 48 (more specifically, the upper chute guide 54). Thus, the dropped position of the snow thrown from the chute guide 48 and falling down while describing a parabola can be within an illumination area of the light projector 103. Therefore, the dropped position of the snow can be illuminated with the light projector 103, thereby confirming a situation of the dropped position of the snow before the snow is thrown and confirming accumulation amount of the snow when the snow is being thrown.

As illustrated in FIG. 3, FIG. 6, and FIG. 7, the connection pin 93 as a main body side link pivot axis that pivotably supports the link 92 on the chute main body 46 side is arranged on a side opposite to the pivoting range of the chute guide 48 with respect to the hinge shaft 56*c* as the chute guide pivot axis that pivotably supports the chute guide 48 on the chute main body 46, and is arranged higher than the hinge shaft 56*c*.

According to this configuration, the connection pin 93 is arranged on the side opposite to the pivoting range of the chute guide 48 with respect to the hinge shaft 56*c*, and is arranged higher than the hinge shaft 56*c*, so that the pivoting angle θ2 of the link 92 can be smaller than the pivoting angle θ1 of the chute guide 48 (more specifically, the upper chute guide 54). As a result, the dropped position of the snow can be illuminated with the light projector 103 by making at least part of an illumination area of the light projector 103 coincide with the dropped position of the snow thrown from the chute guide 48 and falling down while describing a parabola.

As illustrated in FIG. 3 and FIG. 7, the distance L2 between the connection pin 93 as the main body side link pivot axis and the connection pin 94 as the guide side link pivot axis that pivotably supports the link 92 on the upper chute guide 54 is longer than the distance L3 between the hinge shaft 56*c* as the chute guide pivot axis that pivotably supports the lower chute guide 53 on the chute main body 46 and the hinge shaft 57*c* as the upper chute guide pivot axis that pivotably supports the upper chute guide 54 on the lower chute guide 53.

According to this configuration, the distance L2 between the pair of pivot axes of the link 92 is longer than the distance L3 between the hinge shaft 56*c* as the chute guide pivot axis and the hinge shaft 57*c* as the upper chute guide pivot axis, so that the pivoting angle θ2 of the link 92 can be smaller than the pivoting angle θ1 of the upper chute guide 54.

As illustrated in FIG. 3 and FIG. 10, the light projector 103 is mounted on the link 92 at an angle at which the light is emitted in the substantially horizontal direction so as to include the dropped position of the snow in the state where the upper chute guide 54 is directed to the most upward direction.

According to this configuration, the light projector 103 can illuminate the dropped position of the snow and a wide area surrounding the same, thereby enabling the human operator to easily grasp the situation of the position considerably away from the working machine 10 (see FIG. 1) when the snow is thrown.

Figure 11:
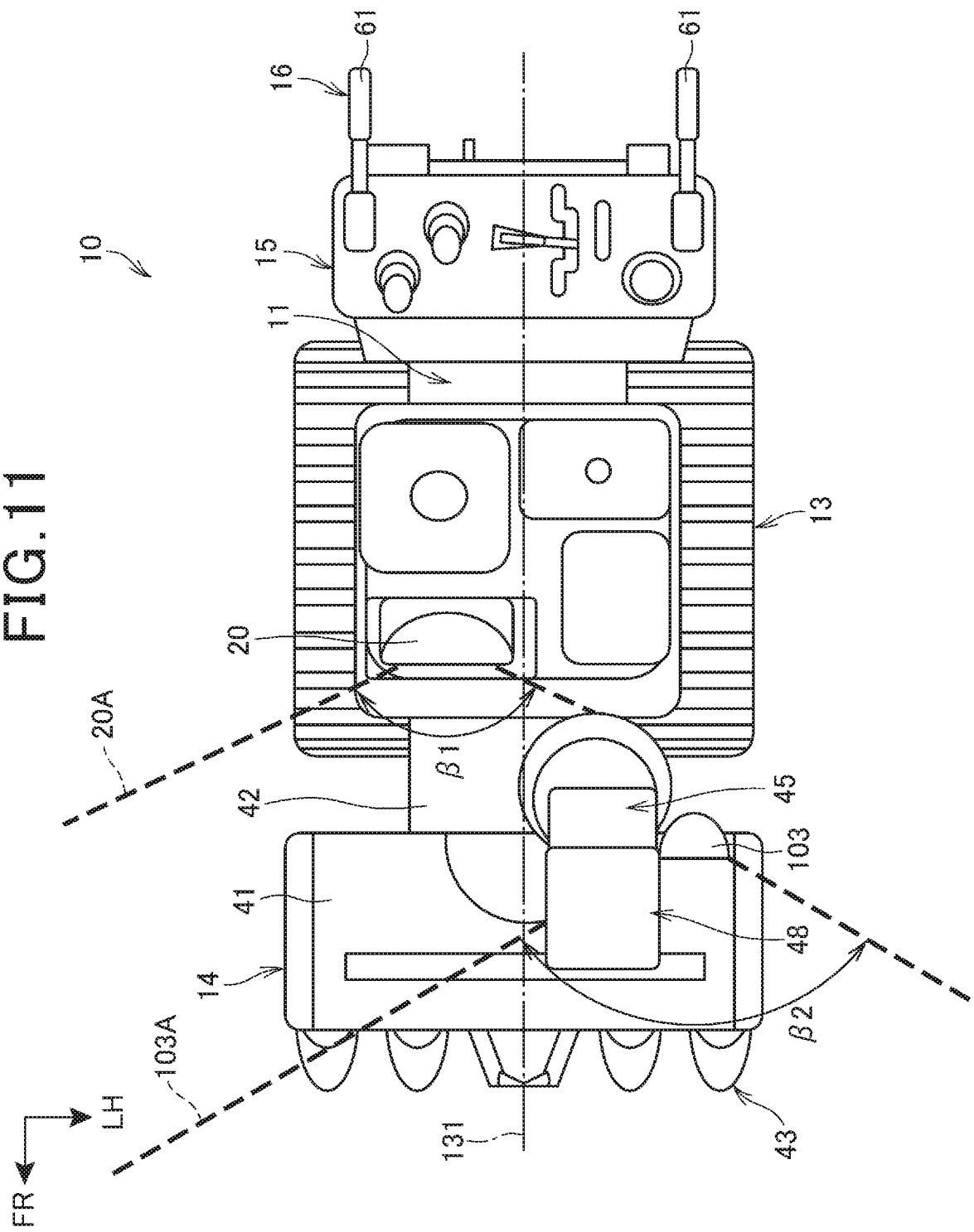
FIG. 11 is a first plan view illustrating the working machine.
Figure 12:
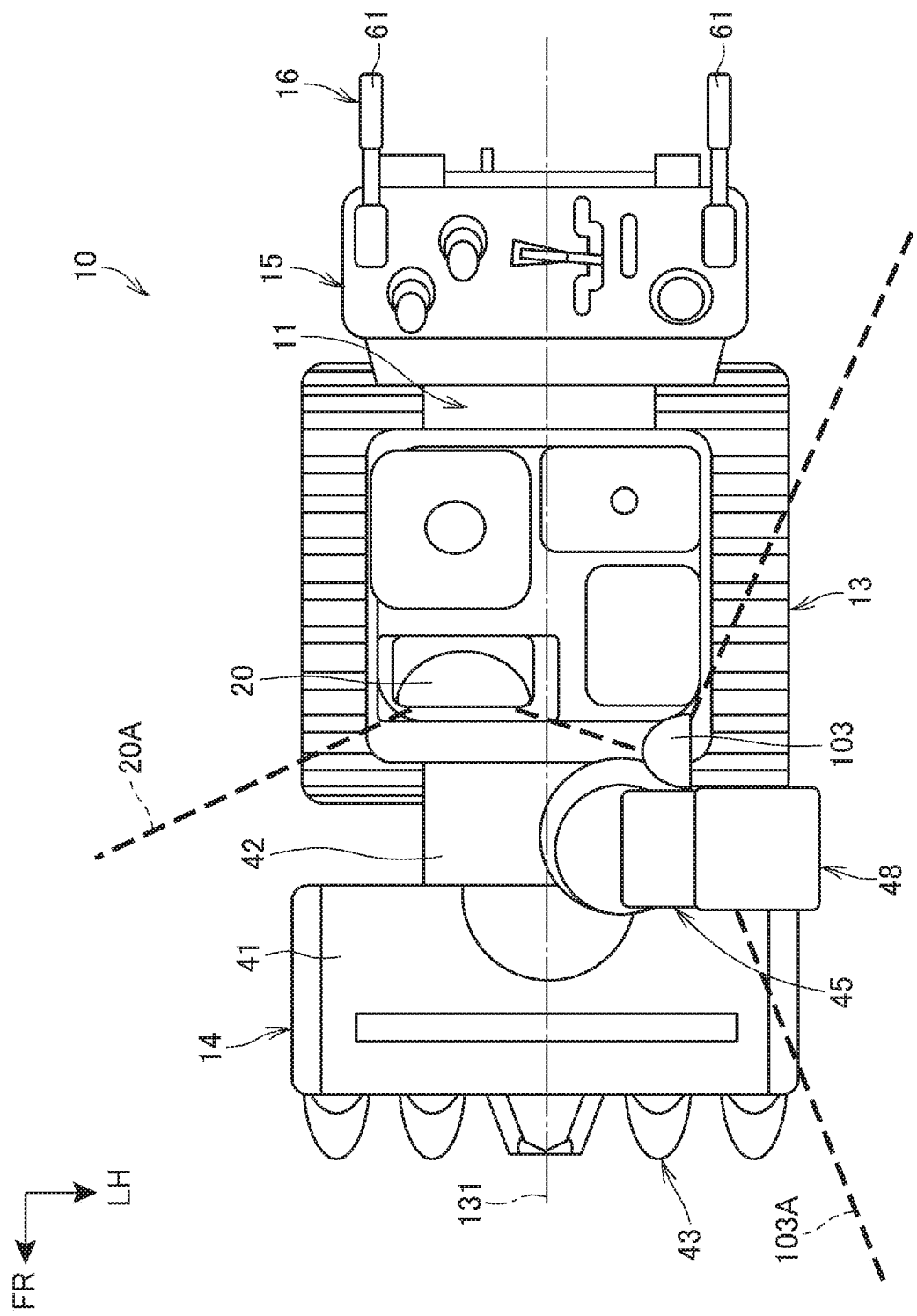
FIG. 12 is a second plan view illustrating the working machine.

FIG. 11 is a first plan view illustrating the working machine 10, and FIG. 12 is a second plan view illustrating the working machine 10.

As illustrated in FIG. 11, in the working machine 10, the headlight 20 is arranged on one side (right side) with respect to a machine body center line 131 that passes through a center of the machine body 11 in a left-right width direction and extends in a front-rear direction, and the chute 45 is arranged on the other side (left side) with respect to the machine body center line 131. The distal end portion of the chute guide 48 in the chute 45 is directed forwardly and obliquely upwardly, and the light projector 103 is directed forwardly.

The headlight 20 is arranged behind the chute 45. Thus, the illuminating angle in the left-right direction of the illumination light 20A emitted from the headlight 20 is denoted as β1. The illuminating angle in the left-right direction of the illumination light 103A emitted from the light projector 103 that is mounted on the link (see FIG. 3) of the chute 45 is denoted as β2.

Since the headlight 20 is arranged behind the chute 45, a part of the illumination light 20A of the headlight 20 is blocked by the chute 45, but the blocked part of the illumination light 20A can be compensated by the illumination light 103A of the light projector 103, and therefore a wide area forward of the working machine 10 can be brightly illuminated.

As illustrated in FIG. 12, the distal end portion of the chute guide 48 in the chute 45 is directed laterally and obliquely upwardly (more specifically, leftwardly and obliquely upwardly), and the light projector 103 is directed laterally. In this case, the blocked part of the illumination light 20A can be compensated by the illumination light 103A of the light projector 103.

As illustrated in FIG. 1 and FIG. 11, the headlight 20 is provided on the machine body 11, the chute 45 is arranged to be offset in either the left or the right direction with respect to the headlight 20, and the light projector 103 is arranged on an opposite side to the headlight 20 across the chute 45. According to this configuration, the headlight 20 and the light projector 103 can illuminate a wide area including forward of the working machine 10.

Since the headlight 20 is arranged to be offset in a rearward direction with respect to the chute 45, the illuminating area forward of the working machine 10 can be compensated by the headlight 20 and the light projector 103, and therefore a wide area forward of the working machine 10 can be illuminated.

As illustrated in FIG. 4(B) and FIG. 11, the link 92 is arranged on either the left or the right side of the chute guide 48, and the light projector 103 is provided to project from the link 92 sideways. According to this configuration, the light projector 103 can be arranged away from the chute guide 48 sideways, and the light projector 103 can illuminate forward without being blocked by the chute guide 48 and the link 92. The light projector 103 can be arranged at a position away from the center in the left-right direction of the working machine 10, so as not to disturb field of front vision of the human operator that performs the snow removal work with the working machine 10.

Second Embodiment

Figure 13:
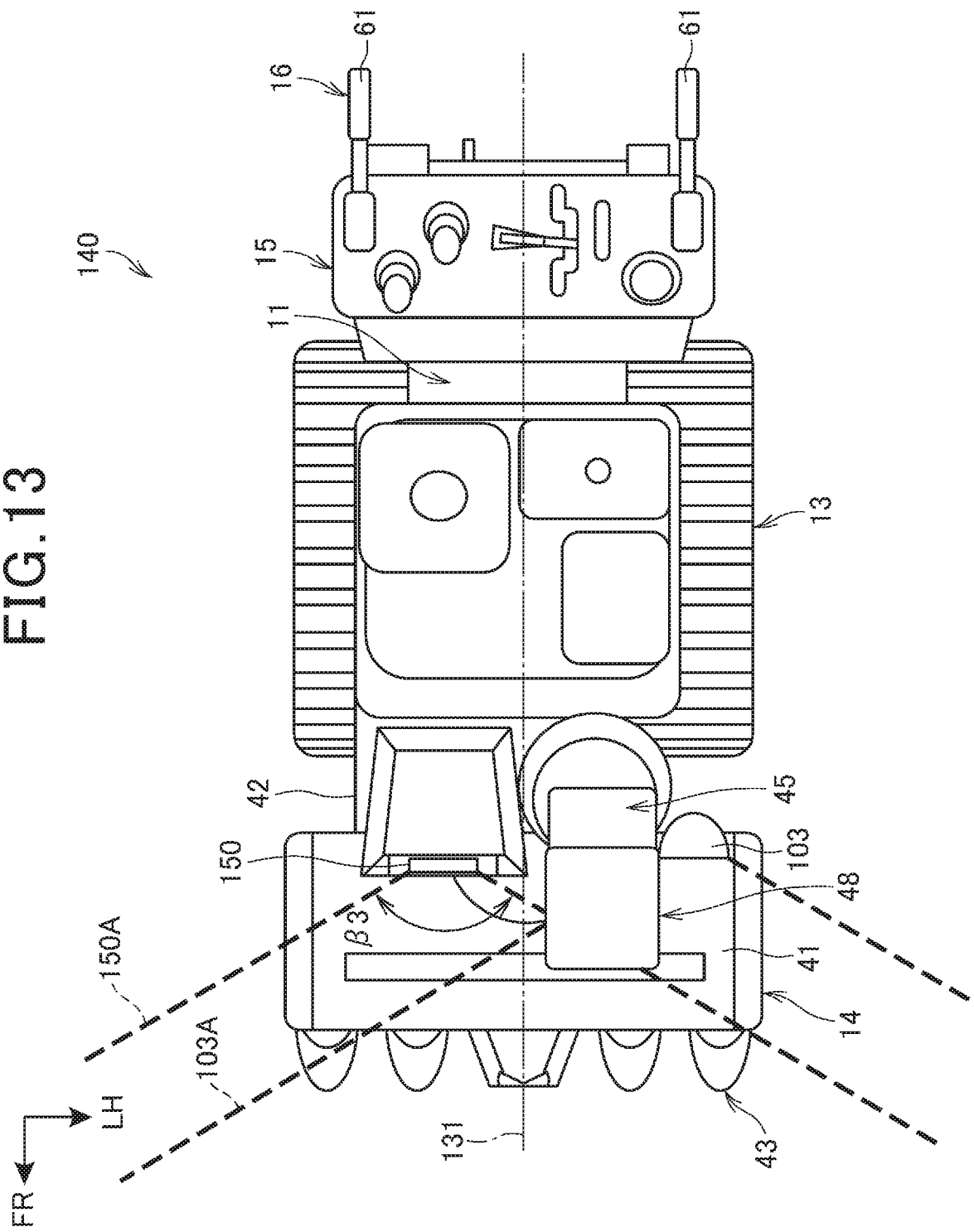
FIG. 13 is a first plan view illustrating a working machine in a second embodiment.
Figure 14:
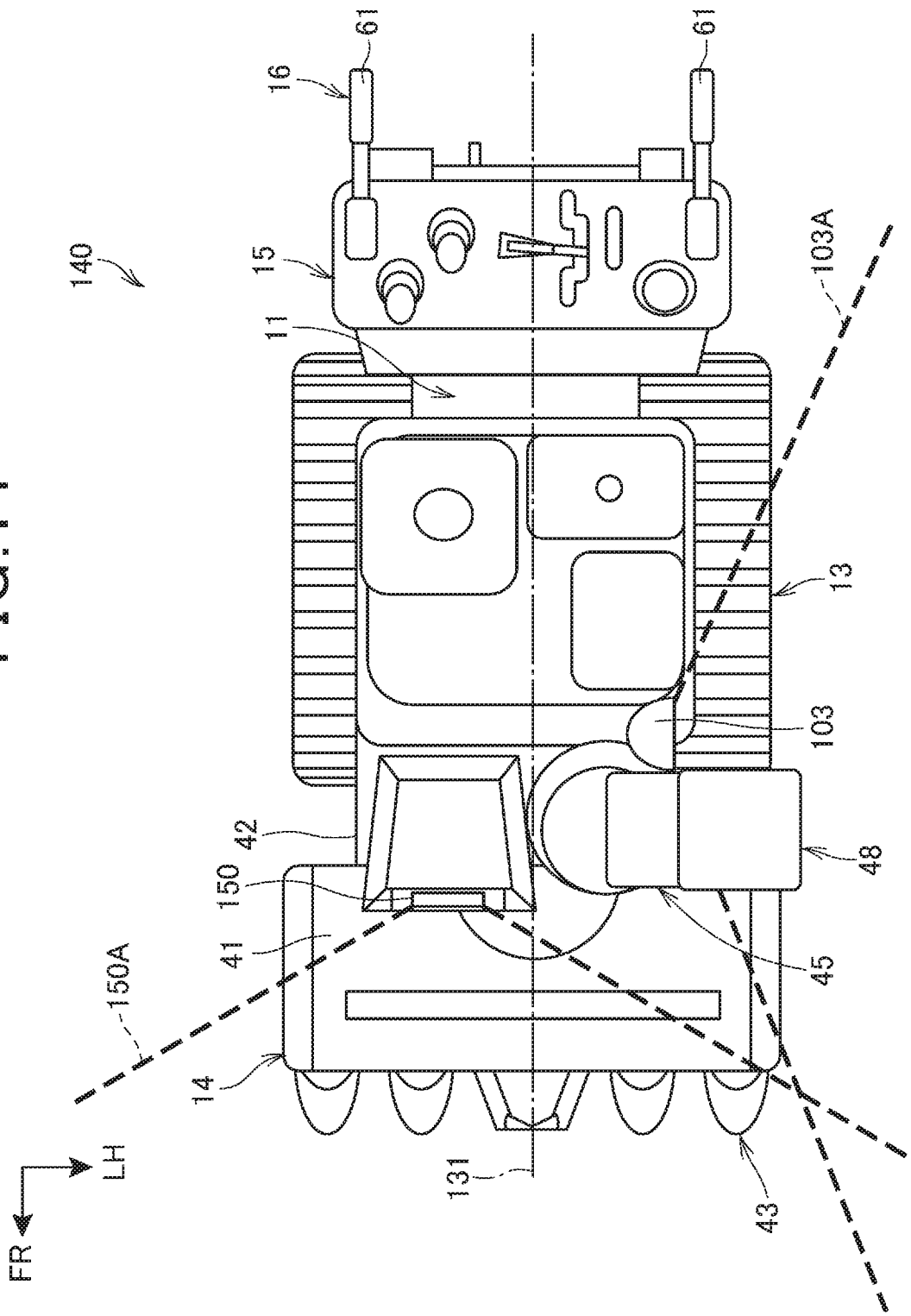
FIG. 14 is a second plan view illustrating the working machine in the second embodiment.

FIG. 13 is a first plan view illustrating a working machine 140 in a second embodiment, and FIG. 14 is a second plan view illustrating the working machine 140 in the second embodiment.

In the second embodiment, the same signs are assigned to the same components as those in the first embodiment, and the detailed description will be omitted.

As illustrated in FIG. 13, the working machine 140 is provided with a headlight 150 instead of the headlight 20 (see FIG. 1) of the working machine 10 (see FIG. 1) in the first embodiment.

As illustrated in FIG. 13, in the working machine 140, the headlight 150 is arranged on one side (right side) with respect to a machine body center line 131 that passes through a center of the machine body 11 in a left-right width direction and extends in a front-rear direction, and the chute 45 is arranged on the other side (left side) with respect to the machine body center line 131. The distal end portion of the chute guide 48 in the chute 45 is directed forwardly and obliquely upwardly, and the light projector 103 is directed forwardly.

The headlight 150 is arranged on one side (right side) of the chute 45. The light projector 103 is arranged on the other side (left side) of the chute 45.

Thus, when the headlight 150 is arranged on one side of the chute 45, the chute 45 is positioned outside of illumination light 150A of the headlight 150 having an illuminating angle β3 in the left-right direction, and therefore a wide area forward of the working machine 140 can be brightly illuminated without blocking the illumination light 150A.

Since the light projector 103 mounted on the chute 45 is directed forwardly, the light projector 103 can also illuminate forward of the working machine 140. Thus, both of the headlight 150 and the light projector 103 can further brightly illuminate forward of the working machine 140.

Since the headlight 150 and the light projector 103 are arranged both sides of the chute 45, respectively, a distance between the headlight 150 and the light projector 103 in the left-right direction can be increased, thereby illuminating wider area forward of the working machine 140.

As illustrated in FIG. 14, the distal end portion of the chute guide 48 in the chute 45 is directed laterally and obliquely upwardly (more specifically, leftwardly and obliquely upwardly), and the light projector 103 is directed laterally. Thus, the light projector 103 illuminates the snow throwing position at the side of the working machine 140 to perform the snow removal work while confirming the forward situation by illuminating forward of the working machine 140 with the headlight 150.

The above-described embodiment absolutely presents one embodiment of the present invention. Various design modification and application may be optionally made within the scope not departing from the gist of the present invention.

For example, in the above-described embodiment, as illustrated in FIG. 3 and FIGS. 4(A) and 4(B), the light projector 103 is mounted on the link 92 through the mounting fitting set 105 in such a manner that it is pivotable in the front-rear direction, but the present invention is not limited to this embodiment. The mounting fitting set 105 may be provided with an illuminating angle adjustment mechanism capable of adjusting the illuminating angle in the up-down direction by directing the light projector 103 upwardly or downwardly.

REFERENCE SIGNS LIST 10, 140 Working machine (snow removal machine)
11 Machine body
20, 150 Headlight
43 Auger
45 Chute
46 Chute main body
48 Chute guide
53 Lower chute guide
54 Upper chute guide
56c Hinge shaft (chute guide pivot axis)
57d Hinge shaft (upper chute guide pivot axis)
92 Link
93 Connection pin (main body side link pivot axis)
94 Connection pin (guide side link pivot axis)
103 Light projector

What is claimed is:

1. A snow removal machine, comprising:
   a machine body;
   a headlight that is provided on the machine body; and
   a chute that is provided on the machine body, and throws away snow,
   wherein the chute includes a chute main body extending upwardly from the machine body, and a chute guide that is pivotably provided on a distal end portion of the chute main body, and adjusts a snow throwing direction that is an up-down direction of the snow to be thrown,
   the chute guide includes a lower chute guide and an upper chute guide, the lower chute guide is pivotably mounted to an upper end portion of the chute main body, the upper chute guide is pivotably mounted to an upper end portion of the lower chute guide, the chute main body and the upper chute guide are connected through a link, the link is pivotably connected to the chute main body and the upper chute guide, and the link is provided with a light projector so as to be capable of illuminating a dropped position of the snow to be thrown;

and wherein the chute is arranged to be offset in either a left or a right direction with respect to the headlight, and the light projector is arranged on an opposite side to the headlight across the chute.

2. The snow removal machine according to claim 1, wherein a main body side link pivot axis that pivotably supports the link on the chute main body side is arranged on a side opposite to a pivoting range of the chute guide with respect to a chute guide pivot axis that pivotably supports the chute guide on the chute main body, and is arranged higher than the chute guide pivot axis.

3. The snow remove machine according to claim 1, wherein the headlight is arranged to be offset in a rearward direction with respect to the chute.

4. The snow removal machine according to claim 2, wherein the link is arranged on either a left or a right side of the chute guide, and the light projector is provided to project from the link sideways.

5. The snow removal machine according to claim 2, wherein a distance between the main body side link pivot axis and a guide side link pivot axis that pivotably supports the link on the upper chute guide is longer than a distance between the chute guide pivot axis that pivotably supports the lower chute guide on the chute main body and an upper chute guide pivot axis that pivotably supports the upper chute guide on the lower chute guide.

6. The snow removal machine according to claim 2, wherein the light projector is mounted on the link at an angle at which light is emitted in a substantially horizontal direction so as to include a dropped position of the snow in a state where the upper chute guide is directed to a most upward direction.

7. The snow remove machine according to claim 1, wherein the link is arranged on either a left or a right side of the chute guide, and the light projector is provided to project from the link sideways.

8. The snow removal machine according to claim 3, wherein the link is arranged on either a left or a right side of the chute guide, and the light projector is provided to project from the link sideways.

9. The snow removal machine according to claim 5, wherein the light projector is mounted on the link at an angle at which light is emitted in a substantially horizontal direction so as to include a dropped position of the snow in a state where the upper chute guide is directed to a most upward direction.

10. The snow removal machine according to claim 1, wherein the upper chute guide pivots by a pivoting angle $\theta 1$ and the link pivots by a pivoting angle $\theta 2$, and wherein the pivoting angle $\theta 1$ is bigger than the pivoting angle $\theta 2$.

* * * * *